(12) United States Patent  
Campbell et al.

(10) Patent No.: US 9,400,686 B2  
(45) Date of Patent: *Jul. 26, 2016

(54) PROCESS GROUPING FOR IMPROVED CACHE AND MEMORY AFFINITY

(71) Applicant: International Business Machines Corporation, Armonk, NY (US)

(72) Inventors: Neil Anthony Campbell, Glossop (GB); Chaitanya Mangla, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,906

(22) Filed: Jan. 15, 2016

(65) Prior Publication Data

US 2016/0132355 A1 May 12, 2016

Related U.S. Application Data

(63) Continuation of application No. 13/884,541, filed as application No. PCT/IB2012/050682 on Feb. 15, 2012, now Pat. No. 9,262,181.

(30) Foreign Application Priority Data

May 10, 2011 (EP) .................................... 11165537

(51) Int. Cl.  
*G06F 9/46* (2006.01)  
*G06F 9/48* (2006.01)  
(Continued)

(52) U.S. Cl.  
CPC ............ *G06F 9/4881* (2013.01); *G06F 9/5016* (2013.01); *G06F 9/544* (2013.01); *G06F 9/546* (2013.01); *G06F 2209/5021* (2013.01); *G06F 2209/548* (2013.01)

(58) Field of Classification Search  
None  
See application file for complete search history.

(56) References Cited

U.S. PATENT DOCUMENTS

| 5,745,778 A | 4/1998 | Alfieri |
| 5,826,079 A | 10/1998 | Boland et al. |

(Continued)

FOREIGN PATENT DOCUMENTS

| WO | 0203192 | 1/2002 |
| WO | 2007128168 | 11/2007 |

OTHER PUBLICATIONS

McGregor et al. "Scheduling Algorithms for Effective Thread Pairing on Hybrid Multiprocessors", Proceedings of the 19th IEEE IPDPS 2005, (McGregor_2005.pdf; pp. 1-10).*

(Continued)

*Primary Examiner* — Hiren Patel  
(74) *Attorney, Agent, or Firm* — DeLizio Law, PLLC (57) ABSTRACT

A multiprocessor computer system and method for use therein are provided for assigning processes to processor nodes. The system can determine a first pair of processes and a second pair of processes, each process of the first pair of processes executing on different nodes and each process of the second pair of processes executing on different nodes. The system can determine a first priority value of the first pair of processes, based at least in part on a first resource access rate of the first pair of processes; and determine a second priority value of the second pair of processes, based at least in part on a second resource access rate of the second pair of processes. The system can determine the first priority value is greater than the second priority value; and determine to reassign a first process of the first pair of processes to a first node, wherein a second process of the first pair of processes is executing on the first node.

20 Claims, 6 Drawing Sheets (51) Int. Cl.
*G06F 9/50* (2006.01)
*G06F 9/54* (2006.01)

(56) References Cited

U.S. PATENT DOCUMENTS

| | | | |
|---|---|---|---|
| 6,105,053 A | 8/2000 | Kimmel et al. | |
| 6,243,788 B1 | 6/2001 | Franke et al. | |
| 6,269,390 B1 | 7/2001 | Boland | |
| 6,289,369 B1 | 9/2001 | Sundaresan | |
| 6,769,017 B1 | 7/2004 | Bhat et al. | |
| 6,996,822 B1 | 2/2006 | Willen et al. | |
| 7,363,288 B2* | 4/2008 | Santos | G06F 17/30168 |
| 7,516,455 B2* | 4/2009 | Matheson | G06Q 10/06 |
| | | | 709/238 |
| 7,574,708 B2 | 8/2009 | Chung et al. | |
| 8,051,418 B1 | 11/2011 | Dice | |
| 8,621,184 B1* | 12/2013 | Radhakrishnan | G06F 9/4881 |
| | | | 712/220 |
| 8,856,794 B2 | 10/2014 | Kruglick | |
| 2003/0172106 A1* | 9/2003 | Highleyman | G06F 11/1492 |
| | | | 718/106 |
| 2004/0226015 A1 | 11/2004 | Leonard et al. | |
| 2005/0188372 A1 | 8/2005 | Inoue | |
| 2005/0210468 A1 | 9/2005 | Chung et al. | |
| 2007/0118838 A1* | 5/2007 | Tsujino | G06F 9/4881 |
| | | | 718/103 |
| 2007/0169042 A1 | 7/2007 | Janczewski | |
| 2008/0235688 A1 | 9/2008 | Panttaja et al. | |
| 2009/0113442 A1* | 4/2009 | Deidda | G06F 9/5044 |
| | | | 718/105 |
| 2009/0187915 A1 | 7/2009 | Chew et al. | |
| 2009/0193122 A1 | 7/2009 | Krishamurthy | |
| 2009/0307439 A1 | 12/2009 | Jacobs et al. | |
| 2009/0328047 A1 | 12/2009 | Li et al. | |
| 2009/0328055 A1* | 12/2009 | Bose | G06F 1/3203 |
| | | | 718/105 |
| 2010/0107174 A1* | 4/2010 | Suzuki | G06F 9/5033 |
| | | | 718/104 |
| 2011/0055838 A1 | 3/2011 | Moyes | |
| 2012/0272016 A1 | 10/2012 | Bello et al. | |
| 2014/0033220 A1 | 1/2014 | Campbell et al. | |
| 2014/0059554 A1 | 2/2014 | Campbell et al. | |

OTHER PUBLICATIONS

"PCT Application No. PCT/IB2012/050682 International Search Report", Jul. 12, 2012, 11 pages.
"U.S. Appl. No. 13/884,541 Office Action", Jun. 19, 2015, 17 pages.
"U.S. Appl. No. 14/041,347 Office Action", Jun. 19, 2015, 15 pages.
Brecht, "An Experimental Evaluation of Processor Pool-Based Scheduling for Shared-Memory NUMA Multiprocessors", IPPS '97 Proceedings of the Job Scheduling Strategies for Parallel Processing, ISBN 3-540-63574-2, 1997, 18 pages.
Debattista, et al., "Cache-Affinity Scheduling for Fine Grain Multithreading", 2002, pp. 135-146.

* cited by examiner

| PROC | RES | ACCESS | WEIGHT | SCORE |
|---|---|---|---|---|
| 1 | 1 | 2 | 3 | 6 |
| 1 | 2 | 0 | 1 | 0 |
| 1 | 3 | 3 | 1 | 3 |
| 1 | 4 | 1 | 2 | 2 |
| 2 | 1 | 0 | 3 | 0 |
| 2 | 2 | 0 | 1 | 0 |
| 2 | 3 | 1 | 1 | 1 |
| 2 | 4 | 2 | 2 | 4 |
| 3 | 1 | 5 | 3 | 15 |
| 3 | 2 | 2 | 1 | 2 |
| 3 | 3 | 2 | 1 | 2 |
| 3 | 4 | 4 | 2 | 8 |

PROCESS GROUPING FOR IMPROVED CACHE AND MEMORY AFFINITY

RELATED APPLICATIONS

This application is a Continuation of and claims the priority benefit of U.S. application Ser. No. 13/884,541 filed May 9, 2013 which is a 371 of the PCT International Application No. PCT/IB2012/050682 filed Feb. 15, 2012, which claims priority to European Patent Application No. 11165537, filed May 10, 2011.

BACKGROUND

The present invention relates generally to the field of computers and computer systems. More particularly, the present invention relates to the allocation of processes to individual processors (nodes) in multiprocessor systems.

Modern computer systems with many processors often have non-uniform memory access (NUMA) properties; that is, the cost of accessing data in memory is dependent on the physical location of the memory in relation to the processor which accesses it. As a result, performance improvements can often be gained by running an application on a limited number of processors and allocating memory which is local to those processors, thereby reducing or eliminating the need for costly remote memory accesses. Similarly, multiple threads which frequently access and modify areas of memory which are shared with other threads can benefit from keeping all users of that memory close together, to reduce the amount of cross-node traffic to obtain cache lines which exist in the cache of a remote processor. These two issues can be referred to as memory affinity and cache affinity.

Placing processes in order to increase the benefits of memory and cache affinity typically conflicts with the more general desire to balance work across all available resources of the whole system; clearly, placing all work onto a single node and allocating all memory locally will increase cache and memory affinity, but in general will not provide good performance for all workloads, due to the increased contention for resources on that node. It is therefore desirable to identify tasks which can benefit from memory and cache affinity and group them together, such that a group of related tasks will tend to run closer together, but that unrelated tasks may be placed across other parts of the system.

There are several existing techniques for identifying this grouping, all of which have drawbacks.

1. Have no automatic grouping of tasks performed by the operating system, but allow the user to group tasks and bind them to specific system resources. This approach relies heavily on the user understanding the behaviour of the workloads and the architecture of the system, and is both time consuming and error prone. Such manual bindings also typically restrict the operating system's load balancing capabilities, thus making it less responsive to changes in load.

2. Have the operating system attempt to group threads of the same process together, but treat processes as separate entities. This can provide significant benefit for some workloads, as threads of the same process will (in most operating systems) share the same address space and are likely to have considerable overlap in the working set of data used by the threads. However, this approach alone does not account for groupings of multiple processes, which means a significant potential benefit is not catered for.

3. Group all threads and processes based on parent-child relationships. This is the approach described in "An Experimental Evaluation of Processor Pool-Based Scheduling for Shared-Memory NUMA Multiprocessors" by T. Brecht, IPPS '97 Proceedings of the Job Scheduling Strategies for Parallel Processing, ISBN 3-540-63574-2, in which no distinction is made between threads and processes, and each time a new thread/process is created, the allocator attempts to place it close to its parent. However, this can mean that tasks which have no significant relationship to the parent will be placed near it, possibly at the expense of future more closely related tasks.

What is required, therefore, is a means to identify groups of processes that can benefit from cache and memory affinity without suffering from these drawbacks.

It should be noted that the term "multiprocessor" as used herein encompasses dual- and multi-core processor devices, as well as multiple hardware thread and multiple CPU systems.

A system which seeks to address some of the above issues is described in U.S. Pat. No. 5,826,079 which relates to a method for improving the execution efficiency of frequently communicating processes utilising affinity scheduling by identifying and assigning the frequently communicating processes to the same processor. The system is based on counting "wakeup" requests between two processors: a wakeup request occurs when a first process requiring information from a second process is placed in a sleep state until the second process is able to provide the required information, at which point the first process is awoken. A count of the number of wakeup requests between the pair of processes is maintained and, when a predetermined threshold is reached, the two processes are assigned to the same processor for execution. Whilst this allocation can improve performance, the determination is non-optimal, as will be described below.

It is therefore an object of the present invention to provide a means for providing an improved allocation of processes to processors in a multiprocessor system and, in particular, a means capable of identifying and addressing potential conflict issues before they arise.

SUMMARY

In accordance with a first aspect of the present invention there is provided a multiprocessor computer system, comprising a plurality of processor nodes; at least one process memory storing a plurality of processes, each run by an allocated one of said plurality of processor nodes; a plurality of system resources accessible by one or more of said processes; and a process allocation controller arranged to: generate process-resource indicators representative of actual or potential access by each process to one or more predetermined ones of said plurality of resources; identify as related, groups of processes sharing one or more resources; apply a prioritisation metric to indicators of a group of related processes to determine a pair of those processes having the highest priority; and allocate the highest priority pair of processes to a single processor node.

With the process controller being arranged to generate indicators representative of actual or potential access to a resource (for example from memory addresses either after or before they are invoked), the present invention is enabled to identify suitable processes for grouping on a node that would be missed by prior art systems such as that of U.S. Pat. No. 5,826,079 described above (which requires a threshold number of instances where a process cannot obtain the necessary data to occur before reallocating). In a system according to the present invention, newly-loaded processes may be analysed by the process allocation controller (which may be a suitably programmed processor node of the system) and beneficially allocated even before running. It will be recognised, however, that the present invention is not limited to analysis at start-up, and the procedure may run more or less continuously as a system background task.

In such a multiprocessor computer system, the process allocation controller is preferably further arranged to apply the prioritisation metric to identify a pair of those processes having a second highest priority and allocate one or both of those processes to the said single processor node if not already so allocated. Preferably, the system would repeat the procedure a number of times until the node is optimally loaded, for example with as many processes as can be handled without adversely affecting performance.

The arrangement of the preceding paragraph assumes that at least one of the second highest priority pair is related to a process of the highest priority pair, leading to their housing on a common node. However, as will be understood, if there is no shared relationship between the processes of the two pairs, the second highest pair may suitably be allocated to a different node, leaving space on the first node for any further processes related to the highest priority pair.

A typical configuration of multiprocessor computer system has some of the processor nodes positioned in close physical proximity to each other and others spaced further apart. In such an arrangement, the process allocation controller may be further arranged to allocate processes of a related group to closely positioned processor nodes if their combined processing requirement indicates that they cannot be accommodated by single processor node. This also allows those processes not identified as a member of a related group to be allocated to the more "remote" processors of the system to both spread the load and leave space for allocation of future processes that may be related to an existing group.

Such a typical configuration may also comprise a plurality of local memories associated with the processing nodes, either one memory per processor or one memory shared between a small group of closely positioned processors. In such an arrangement, where a process has data stored in a local memory associated with a particular processor node handling that process, the process allocation controller may suitably be further arranged to migrate said data to the respectively associated memory when that process is moved to another processor node as a result of allocation following application of the prioritisation metric.

Suitably, the process allocation controller may be arranged to generate process-resource indicators by, for each of a plurality of processes and each of a plurality of system resources, periodically polling the system and then processing the poll results to identify links between individual processes and individual resources.

The or each of the one or more predetermined resources may be selected from the group comprising memory regions, pipes, sockets, semaphores, memory queues, and unmodified Copy-On-Write pages. This is not an exclusive list and other resources may be included.

Also in accordance with the present invention there is provided a method for assigning processes to processor nodes in a multiprocessor computer system having a plurality of resources accessible by the processes, comprising causing the system to perform the steps of: generating process-resource indicators representative of actual or potential access by each process to one or more predetermined ones of said plurality of resources; identifying as related, groups of processes sharing one or more resources; applying a prioritisation metric to indicators of a group of related processes to determine a pair of those processes having the highest priority; and allocating the highest priority pair of processes to a single processor node.

The method may further comprise, through application of the prioritisation metric, identifying a pair of those processes having a second highest priority and allocating one or both of those processes to the said single processor node if not already so allocated. This may be extended to include determining processor requirements of each process assigned to a particular processor, and preventing the assignment of further processes to the said processor which would otherwise result in exceeding the processing capability of that particular processor. As mentioned above, if related processes cannot be accommodated by the same processor node, performance improvements can still be attained by allocating those processes to physically proximate nodes, especially if those nodes have a shared local memory. Also, as above, if the processes of the second highest priority pair do not share a relationship with either or both of the highest priority pair, they may beneficially be allocated to a different node.

The step of generating process-resource indicators may comprise, for each of a plurality of processes and each of a plurality of system resources, periodically polling the system to identify links between individual processes and individual resources.

Where a process has data stored in a local memory associated with a processor handling that process, the method may further comprise migrating that data when the associated process is moved to another processor as a result of allocation following application of the prioritisation metric.

Within the prioritisation metric, the individual system resources may be assigned a ranking, with the metric including this ranking in determining the pair of processes having the highest priority. For example, shared access to a particular area of memory may be rated more highly than a semaphore accessible by a pair of processes.

Where the step of generating process-resource indicators includes generating a numerical value for each, the method may further comprise applying a threshold cut-off and excluding from application of the prioritisation metric those indicators having a value below the threshold. For example, a process that potentially only accesses a particular resource once (perhaps at the distal end of a conditional tree) would have a low value assigned to that process-resource indicator and, by failing the threshold test, would not be considered for pairing on a processor node with a process that makes extensive use of the resource in question.

By using these techniques to identify groups of related processes, such processes as may benefit from being placed close together can be grouped for better performance, while other processes which for example, only share a common parent need not be, allowing more opportunities to place those processes on under-utilised nodes of the system, and allowing more capacity to locate future processes near those with whom they do share. As this is conducted automatically, no burden is placed on the user to understand the detailed behaviour of the applications and the system.

This approach also allows the identification of processes which share resources but have no immediate common ancestor. For example, a database controller may choose to communicate with a process reading the database via a shared memory segment, but the database and the reader process may not be obviously related other than by this shared memory. It is unlikely either that the reader process would have created the database, or that the database would have created the process that reads from it. However, through application of the present invention, the detection of the shared resource (memory segment) would result in the database controller and reader being handled by a shared node, significantly improving access performance for the reader.

The invention further provides a computer program stored on a computer readable medium and loadable into the internal memory of a digital computer, comprising software code portions, when said program is run on a computer, for performing the method according to the invention and as described above.

The summary of the present invention does not recite all the necessary features of the invention, and sub-combinations of those features may also encompass the invention.

BRIEF DESCRIPTION OF THE DRAWINGS

The present invention will now be described, by way of example only, with reference to preferred embodiments, as illustrated in the following figures, in which.

DESCRIPTION OF EMBODIMENT(S)

Figure 1:
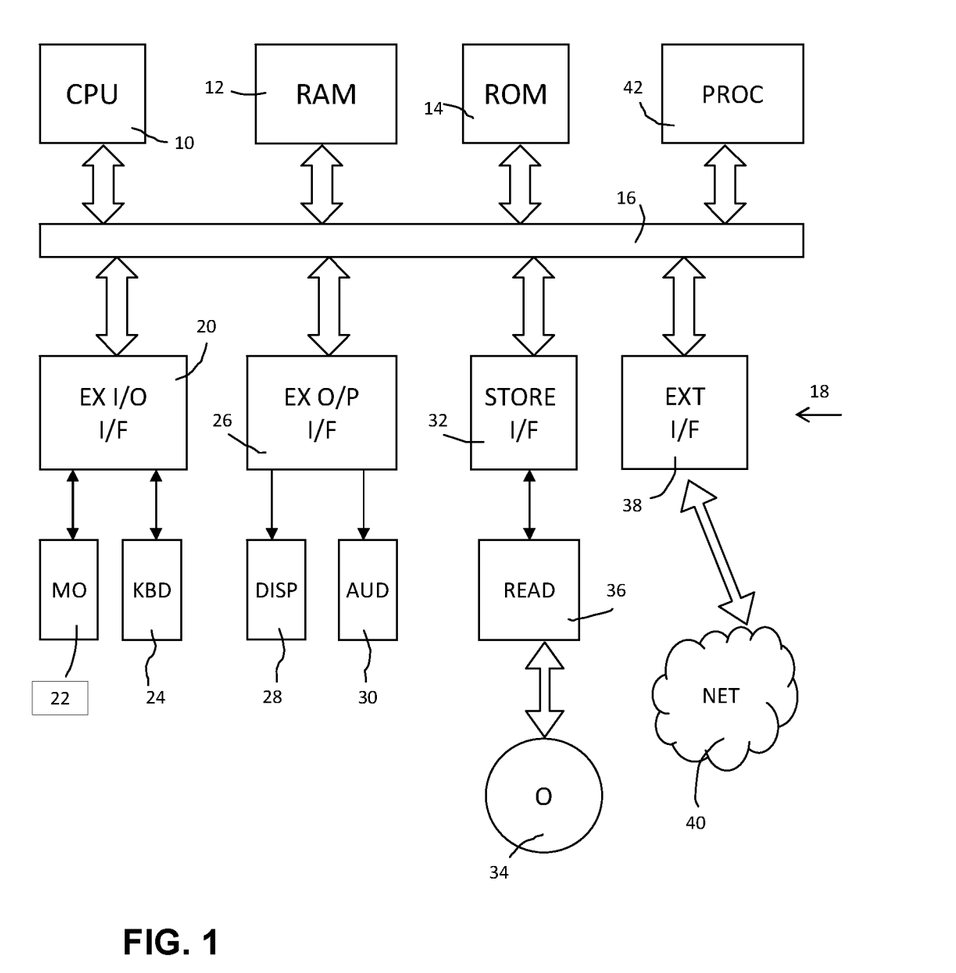
FIG. 1 is a block schematic diagram of the components of a multiprocessor computer system suitable to embody the invention.

FIG. 1 schematically represents the components of a computer system suitable to embody the present invention. A first processor CPU 10 is coupled with random access memory RAM 12 and read only memory ROM 14 by an address and data bus 16. As will be understood, and as will be described below, CPU 10 may comprise a cluster of processors (nodes) with individual processes and/or process threads being handled by individual nodes. Also connected to CPU 10 via the address and data bus 16 is at least one further processor 42 (or cluster of nodes), which may be a further CPU sharing tasks with the first CPU 10, or may be a coprocessor device supplementing the function of the CPU 10, handling processes such as floating point arithmetic, graphics processing, signal processing and encryption. Each of these internal hardware devices 10, 12, 14, 42 includes a respective interface (not shown) supporting connection to the bus 16. These interfaces are conventional in form and need not be described in further detail.

Also connected to the CPU 10 via bus 16 are a number of external hardware device interface stages (generally denoted 18). A first interface stage 20 supports the connection of external input/output devices, such as a mouse 22 and/or keyboard 24. A second interface stage 26 supports the connection of external output devices such as a display screen 28 and/or audio output device 30, such as headphones or speakers. A third interface stage 32 supports the connection to external data storage devices in the form of computer readable media: such external storage may as shown be provided by a removable optical or magnetic disc 34 (accessed by a suitably configured disc reader 36). Alternatively or additionally the external storage may be in the form of a solid state memory device such as an extension drive or memory stick.

The external storage may contain a computer program, containing program software code portions which, when run by the CPU 10 and/or further processor 42, perform the method according to the present invention. A fourth interface stage 38 supports connection of the system to remote devices or systems via wired or wireless networks 40, for example over a local area network LAN or via the internet.

The CPU 10 and further processor 42 may be of many different types, from different manufacturers, and based on different instructions set architectures (ISAs), although for ease of process allocation, it is preferred that the nodes of a cluster are identical devices.

Figure 2:
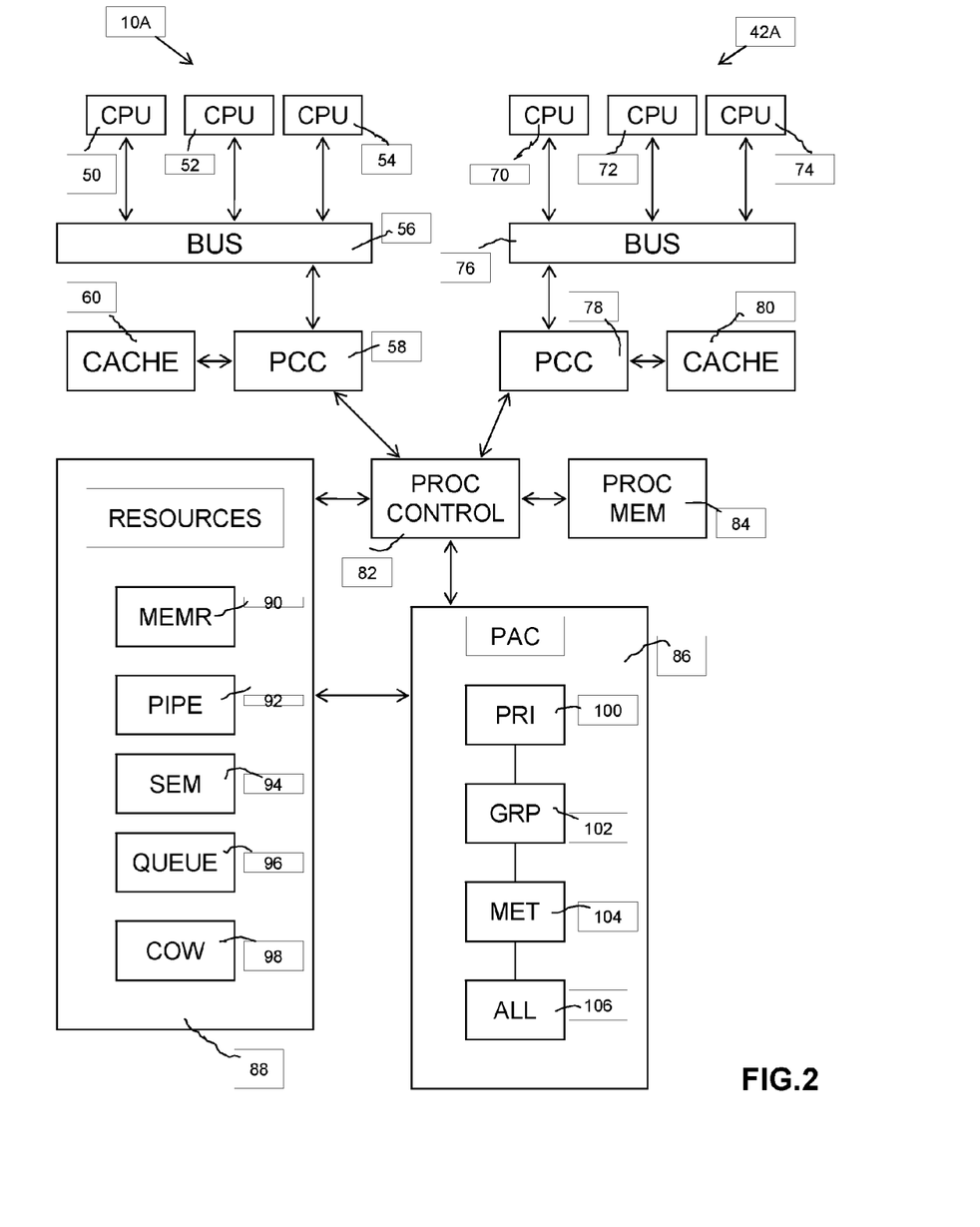
FIG. 2 is a further schematic representation of functional components of a multiprocessor system supporting automatic allocation of processes.

FIG. 2 schematically represents components of a multiprocessor system arranged to automatically allocate processes to processors. A first cluster 10A of processors (nodes) 50, 52, 54 is connected via a bus 56 and program cache controller (PCC) 58 to a local memory device, cache 60. A second cluster 42A of nodes 70, 72, 74 is connected via a bus 76 and PCC 78 to a further cache 80. Although shown as sharing caches, it will be understood that in an alternative arrangement each node may have its own cache: this would generally increase the efficiency of the node, but may incur penalties through an increase in remote cache accesses required across the system.

Coupled with the clusters 10A, 42A and the associated PCC and caches is a process controller 82 linked with a process memory 84. The process memory 84, which may comprise an area of ROM 14 (FIG. 1), stores a library of processes to be run by respectively allocated nodes. As discussed above, it is an aim of multiprocessor systems to balance the process load across the available nodes, whilst placing related tasks in close proximity. In the example of FIG. 2, if a pair of processes are respectively being run on nodes 50 and 72, which processes access common system resources, there would either be unnecessary duplication of data in caches 60, 80, or delays introduced due to remote cache calls as a node seeks to access data in the cache of another cluster.

In a system embodying the invention, such related processes are identified. Unlike in most existing techniques for placing related workloads close together, this identification can be performed after process creation, as it is not necessary to make a final placement decision at process creation time. Instead, this identification may be performed by a separate function in the operating system, or by a separate user space process, rather than by the operating system (OS) scheduler itself. Once a group of two or more related processes is identified, processes may be moved to the same node and optionally, their memory may be migrated to that of the node, that is to say to the cache of the individual node or node cluster.

In the example of FIG. 2, a process allocation controller (PAC) 86 is coupled with the process controller 82 and both have access to the system resources, indicated generally at 88. The PAC 86 is arranged to perform the functions of:

generating process-resource indicators representative of actual or potential access by each process to one or more predetermined ones of said plurality of resources;

identifying as related, groups of processes sharing one or more resources;

applying a prioritisation metric to indicators of a group of related processes to determine a pair of those processes having the highest priority; and allocating the highest priority pair of processes to a single processor node, as will be described in further detail below. These indicators include (but are not limited to):

shared memory regions 90 to which each process is attached;

pipes or sockets 92 which are open by both processes;
semaphores 94 accessible by both processes;
shared message queues 96;
unmodified Copy-On-Write pages 98; that is, pages which are logically separate but which will be mapped to the same physical page until one process modifies them.

Figure 3:
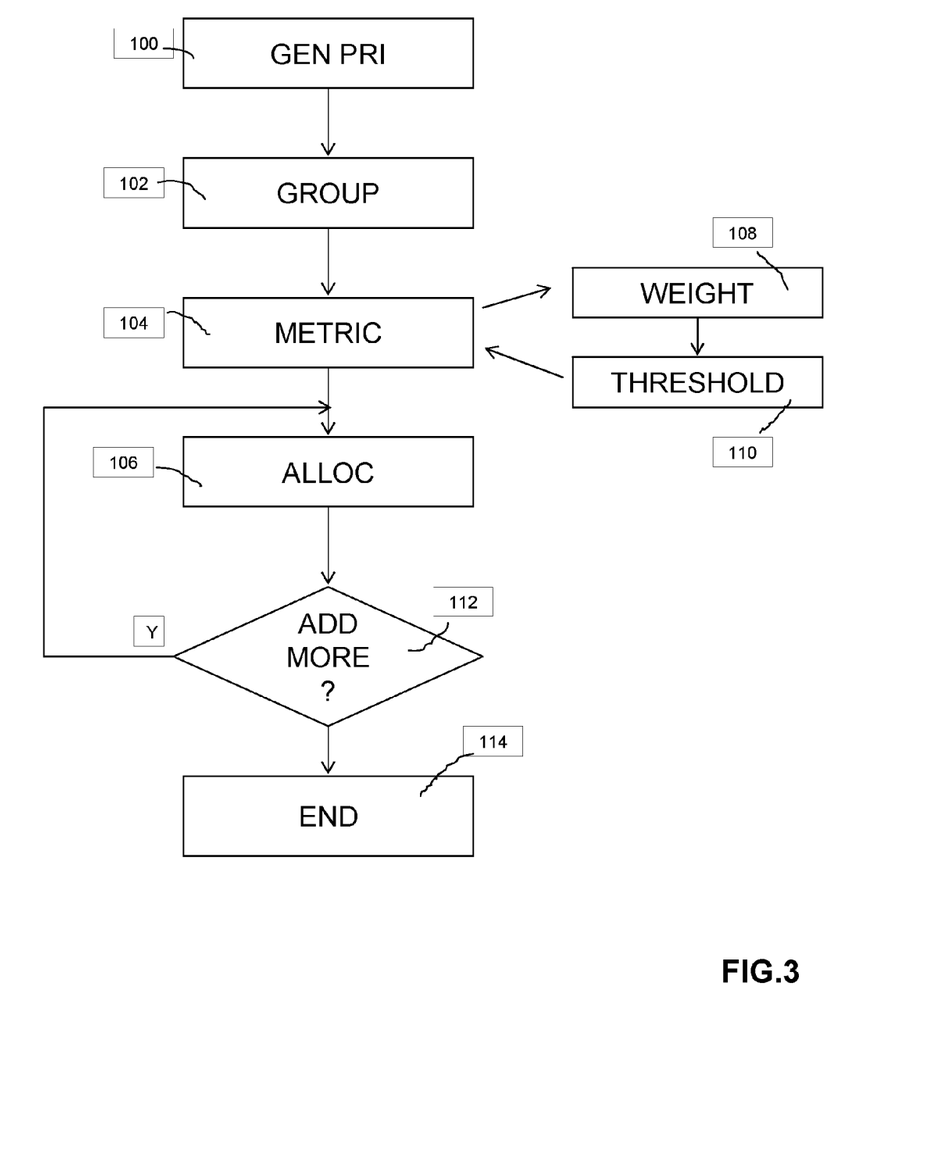
FIG. 3 is a flow chart showing high-level steps in a method of process allocation.

The steps of the method for assigning processes to processor nodes in a multiprocessor computer system are directed by the PAC 86 and, as generally illustrated by the flowchart of FIG. 3, commence at step 100 with causing the system to generate process-resource indicators representative of actual or potential access by each process to one or more of the system resources. Next, at step 102, groups of processes sharing one or more resources are identified as a related group. At step 104 a prioritisation metric is applied to the indicators of a group of related processes to determine a pair of those processes having the highest priority. At step 106, the highest priority pair of processes are allocated to a single processor node, and at step 112 a check is made as to whether there are further members of the related group which can be added to the node: if so, the procedure reverts to step 106, else it ends at 114.

As will be described below, the step 104 of applying the prioritisation metric may further include applying a weighting (step 108) to the collected indicators and/or applying a threshold cut-off (step 110) to reduce the number of indicators to be further processed.

Figure 4:
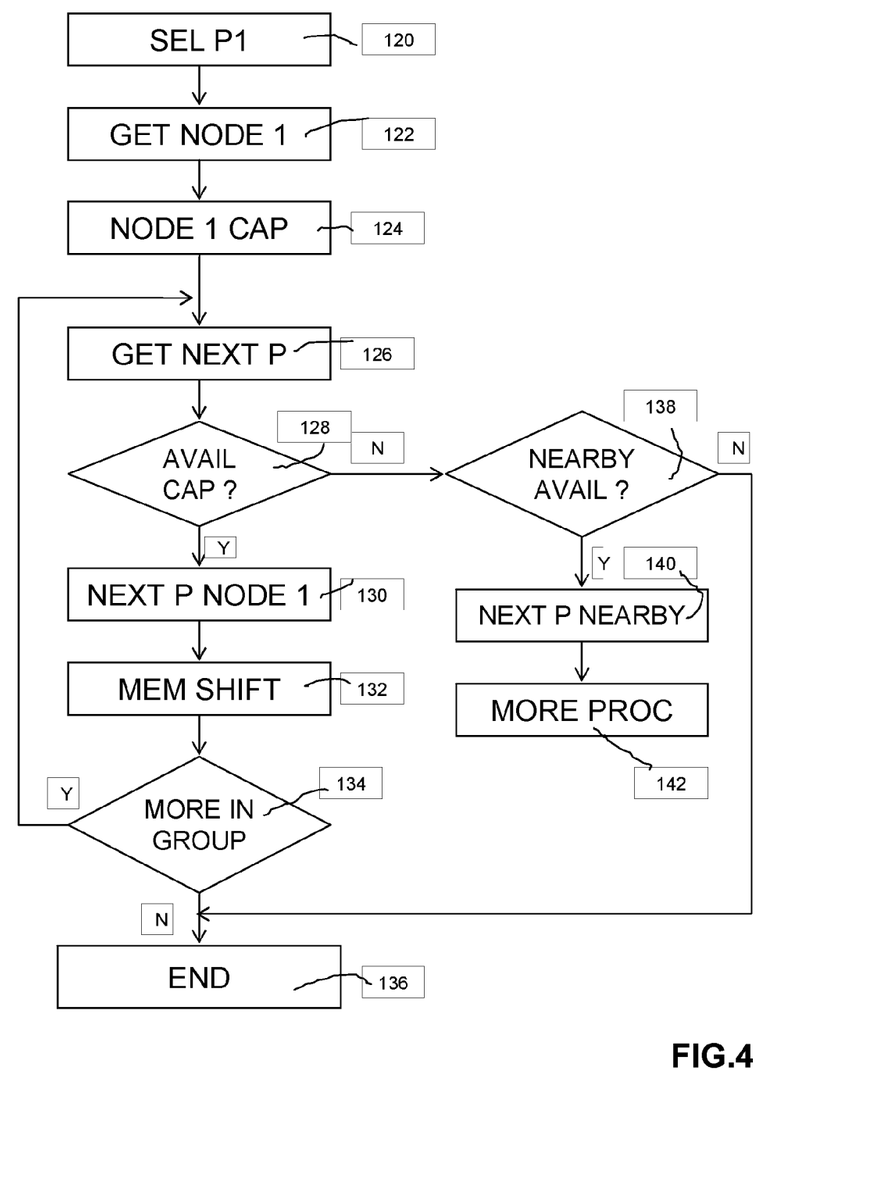
FIG. 4 is a flow chart representation of process allocation based on derived process-resource indicators.

FIG. 4 represents one possible method for handling the allocation of processes to nodes when a group of related processes has been identified. The process starts at step 120 with the selection of a first process P1 of the highest priority pair. At step 122, the node on which that process P1 runs is identified and, at step 124, the available capacity of that node to handle further processes is determined. At step 126, the next process of the group (initially the second process of the highest priority pair) is selected and, at step 128, a check is made as to whether the node has the capability to also handle the newly-selected process. If so, at step 130, this process is assigned to the node.

As mentioned above, when a process is migrated to a node, optionally its memory may be migrated at step 132. Referring back to FIG. 2, it will be appreciated that a process being migrated from node 54 to node 50 will not generally require memory migration as the two processes already share a cache 60.

Returning to FIG. 4, having assigned the second process to the node, a check is made at step 134 as to whether there are further processes in the group. If there are not, the procedure ends at step 136. If step 134 identifies further processes in the group, the procedure reverts to step 126 at which the next process is selected.

If the test at step 128 indicates that there is insufficient capacity in the node under consideration, the procedure moves to step 138 at which a determination is made as to whether there is an available node (one with available capacity) in close physical proximity to the node under consideration. Reverting to FIG. 2, if the PAC 86 determines that a process currently running on node 74 in cluster 42A is ideally to be migrated to node 50 in cluster 10A but there is insufficient capacity in node 50 to handle the additional process, useful benefits still arise if the process can instead be migrated to node 52 as this shares a cache 60 with the originally intended target node 50.

Returning to FIG. 4, if the test at step 138 identifies that there is a nearby node with capacity then, at step 140, the process is migrated to this nearby node. Following this, at step 142, any further processes of the related group are handled in like manner to steps 126, 128, 130, 132, 134 but with the nearby node as the chosen destination. In a refinement to the procedure, the further processes of the related group may still be checked against the original target node as it may be the case that they have lower requirements which can be met by the original node.

Lastly, if the test at step 138 does not identify a suitable nearby node to handle the "overspill" from the first node, the procedure ends at step 138. It would usually be inappropriate to force processes onto nodes that are unable to handle them efficiently, which is the reason for the procedure end in this example. However, in some cases it may be detectable that the benefit to performance to be obtained by grouping the processes outweighs the cost of overloading the node, and in such cases the node capacity is exceeded.

One possible way of conducting the identification of process-resource pairs, to enable the formation of a group of related processes, would be to periodically poll the list of processes on the system. For each process, a list is collected of indicators representing 'interesting' resources it uses. An example of such a list is discussed below with reference to FIG. 5.

To gather further evidence of the significance of these indicators, statistics may be collected by the operating system on such resource usage; for example, the number of times a pipe has been read from or written to, or the number of accesses made to shared memory (on some processor architectures, this last piece of data may be expensive to collect: however, some processor architectures may have specific hardware support for such detection and/or may allow identification of frequently accessed pages without resorting to page protection and page fault counting).

Having gathered this data for all processes (or at least, all processes with a resource consumption large enough to warrant it; potentially only the N most frequently accessing processes would be considered), each process-resource pair can be assigned a relative priority (process-resource indicator value). This can be based on both a static priority given to different types of resource sharing (for example, shared memory may be treated as more important than a shared message queue) and any detailed statistics gathered about the use of each resource. This priority would show which resource uses would offer the most benefit from having the accessing processes placed locally.

Figure 5:
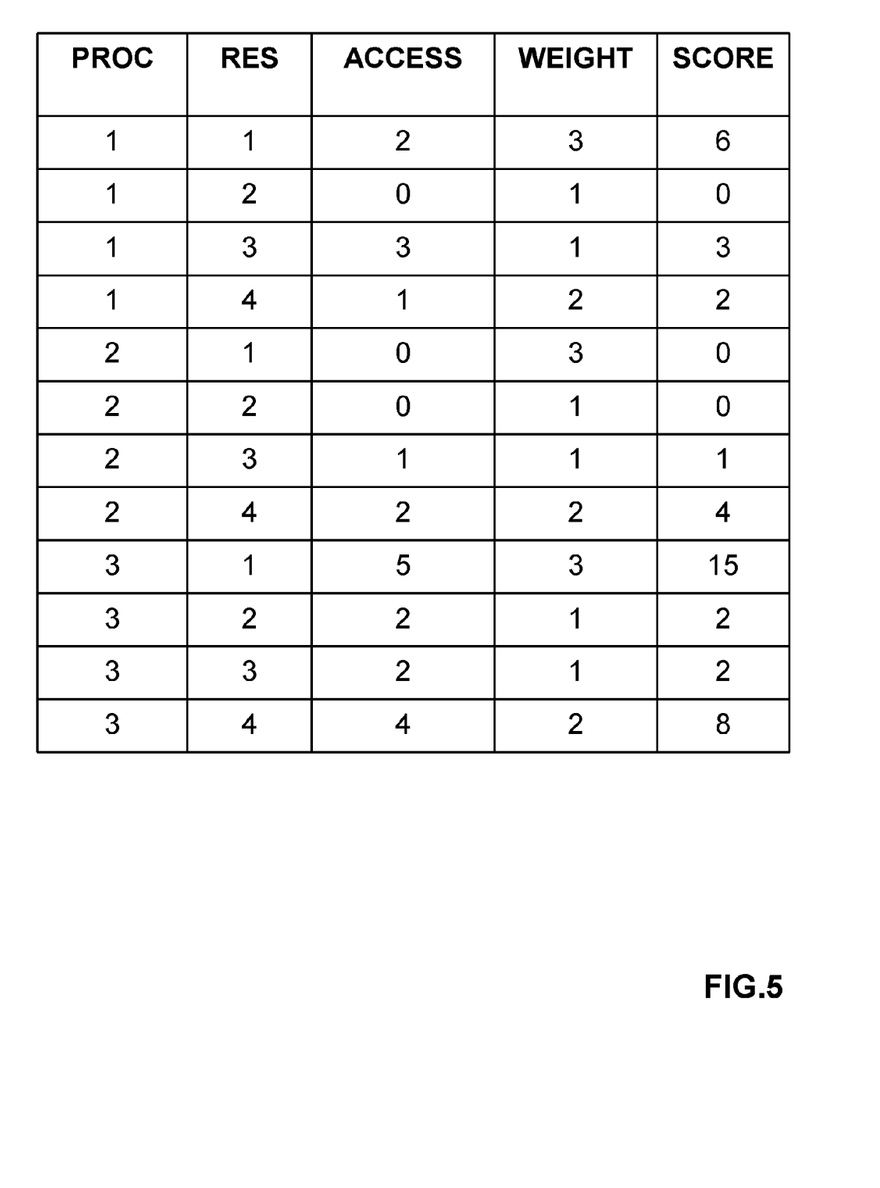
FIG. 5 is an example table of values illustrating process-resource indicator selection.

FIG. 5 is a table showing, in greatly simplified form, data that may be collected in support of the allocation process. The first column contains a numerical identifier for each of the three processes considered. The second column contains a numerical identifier for each of the four system resources considered. The third column indicates the number of accesses to the resource by the process. The fourth column indicates a weighting value to be used in the determination of a final numerical score, given in column five. As previously mentioned, some resources may be treated as being more important than others: in this example, resource 1 (for example a shared memory) has a weighting of 3 whilst resource 3 (for example a shared message queue) has a weighting of 1.

Figure 6:
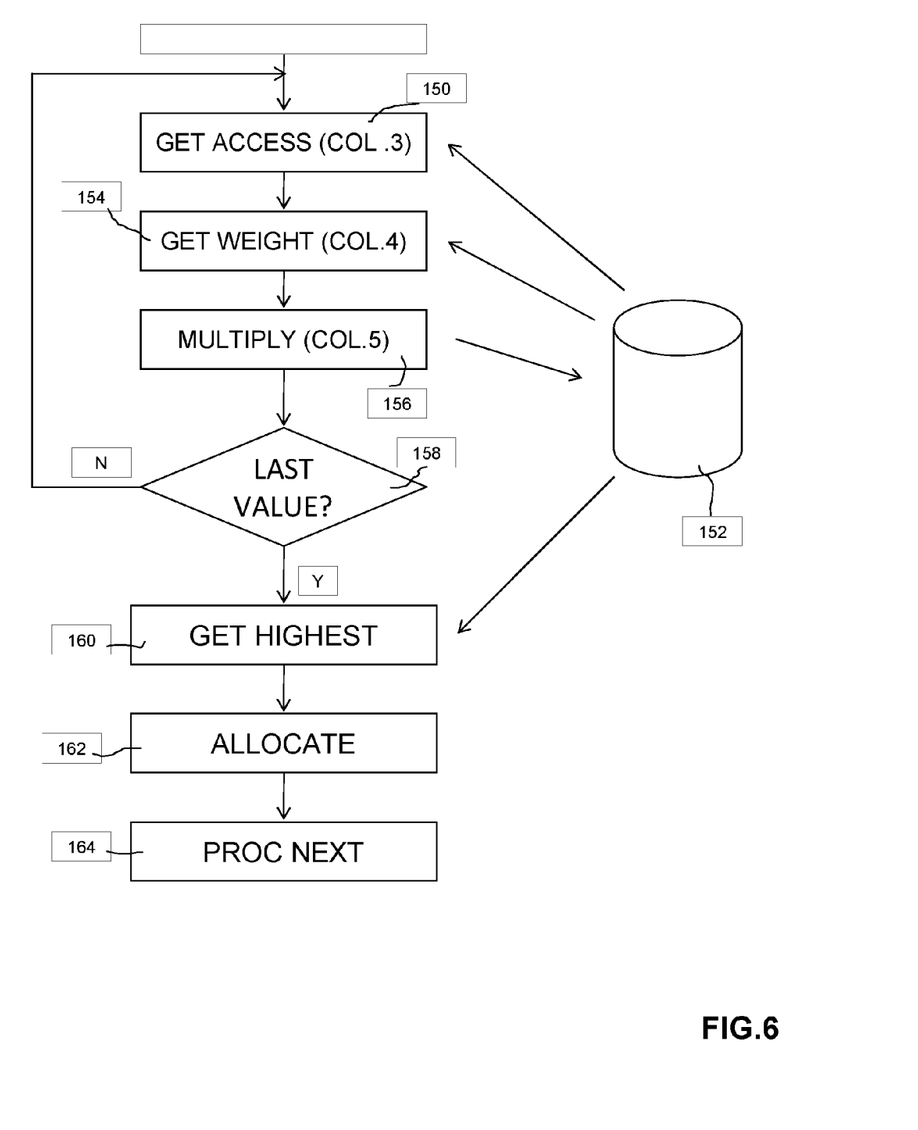
FIG. 6 is a flow chart representation of an allocation metric applied to the table of FIG. 5.

In this simplistic example, the resulting priority score for each indicator (process-resource indicator) may be obtained by application of an allocation metric as represented in flow chart form in FIG. 6. The first step 150 is to obtain the number of accesses from column three of the table stored in memory 152. This is followed by obtaining the weighting from column four in step 154. At step 156, the number of accesses and the weighting are multiplied and the result entered in column 5 of the table in memory 152. At step 158, a check is made as to whether there are unprocessed results in the table. If so, the procedure reverts to steps 150 and 154 in which the next pair of access count and weighting are obtained followed by multiplication (step 156) and adding to the stored data.

If the check at step 158 shows that all values in columns three and four have been processed, the procedure moves to step 160 where the score for process pairs 1 and 2, 2 and 3, and 3 and 1 based on each of the resources they share, are compared to identify the highest combined process-resource score. The result of this indicates that the highest priority pair of processes is 1 and 3 through their shared use of resource 1, giving an aggregate score of 21. Consequently, in allocation step 162, processes 1 and 3 will be migrated by the system to a common node (commonly one of the two nodes to which the pair are currently allocated). Lastly, at step 164, the next highest scoring pair (which will typically involve one of the initial pair) are processed. Repeating the analysis of steps 150 to 160 will show processes 2 and 3 as the next highest scoring pair (with a score of 12 through resource 4). As process 2 has already been migrated, a check (as at step 124 in FIG. 4) will determine whether there is sufficient capacity on the first node to also migrate process 3 or at least capacity on a closely proximate node.

In a practical implementation, for each process-resource pair with a priority above a specified threshold (or alternatively, for all pairs, though searching the whole space may prove expensive), a search is made to see if any other process shares the resource. This information is then used to build a graph of processes, in which the arcs between processes are annotated with the priority of that shared resource as calculated earlier.

If groups of processes are found for which significant sharing is observed, the arc with the highest priority is picked and the two processes that it connects are placed on the same node in the system. As long as there is more space on that node to place additional work, the graph is traversed from the initial processes by following the arcs with the next highest priority from those processes which are already placed. When the node becomes full (that is to say enough processes have been placed to make full use of CPU resources) all remaining arcs between placed and unplaced processes are removed. This procedure can then be repeated with the remaining processes in the graph, placing them on the next available node of the system.

Whilst embodiments of the present invention have been described above, the technical scope of the invention is not limited to the scope of the above-described embodiments. It should be apparent to those skilled in the art that various changes or improvements can be made to the embodiments.

For example, in terms of allocation of processes to nodes, the initial steps of FIG. 4 may be modified such that the home nodes of both processes of the highest priority pair are checked for available capacity to provide basis for a determination as to which process of the pair is to be moved. Indeed, such a check may indicate that both processes are to be moved to a further node having the capacity to handle the pair. Alternatively, or additionally, the decision as to which of a pair to move may take account of which of the processes is busier (more active) at the point of reallocation. A further (more aggressive) option would be to pick the home node of either process, determine the capacity of that node and, if there is insufficient capacity, move one or more other processes away from that node. Yet a further option would be to perform a full reallocation of processes to nodes, starting from the assumption that the whole system is empty and then placing processes one at a time according to where is free and which processes should be located together. In this last case, any processes which are not identified as related may be placed on any node having free space at the end of the allocation exercise.

It is apparent from the description of the appended claims that implementations including such changes or improvements are encompassed in the technical scope of the invention.

What is claimed is:

1. A method for assigning processes to processor nodes in a multi-node system, the method comprising:
   determining a plurality of pairs of processes from a plurality of processes, wherein for each of the plurality of pairs, both processes in the pair access a same shared resource;
   determining a first pair of processes of the plurality of pairs and a second pair of processes of the plurality of pairs, each process of the first pair of processes executing on different nodes and each process of the second pair of processes executing on different nodes;
   determining a first quantity of accesses of to a first resource by the first process;
   determining a second quantity of accesses of the first resource by the second process;
   determining a first score based, at least in part, by multiplying the first quantity of accesses by a weighting value for the first resource;
   determining a second score by multiplying the second quantity of accesses by the weighting value;
   determining a first priority value of the first pair of processes, based at least in part on the first score and the second score;
   determining a second priority value of the second pair of processes, based at least in part on access rates of a second resource of the second pair of processes;
   determining that a first priority associated with the first priority value is greater than a second priority associated with the second priority value; and
   determining to reassign a first process of the first pair of processes to a first node in response to the determination that the first priority is higher than the second priority, wherein a second process of the first pair of processes is executing on the first node.

2. The method of claim 1 further comprising:
   determining a third pair of processes, each process of the third pair of processes executing on different nodes;
   determining a third priority value of the third pair of processes, based at least in part on a third resource access rate of the third pair of processes;
   determining the second priority is higher than a third priority associated with the third priority value; and
   determining to reassign a third process of the second pair of processes to the first node in response to the determination that the third priority is higher than the second priority.

3. The method of claim 1 further comprising:
   determining the first node cannot handle the first process;
   determining a second node can handle the first process; wherein the second node is closer in physical proximity to the first node than a third node currently executing the first process; and
   determining to reassign the first process to the second node.

4. The method of claim 1, wherein determining the first pair of processes and the second pair of processes comprises:
   determining the first pair of processes and the second pair of processes access or potentially access one or more shared resources.

5. The method of claim 4, wherein the one or more shared resources comprises one or more of: a memory region, a pipe, a socket, a semaphore, a message queue, and a copy-on-write page.

6. The method of claim 1, wherein
the first resource accessed by the first process and the second process is different from the second resource accessed by the second pair of processes.

7. The method of claim 6, wherein determining to reassign the first process comprises determining the first score is less than the second score.

8. A computer program product for process allocation, the computer program product comprising:
a computer readable storage device having computer usable program code embodied therewith, the computer readable storage device not including signals, the computer usable program code comprising a computer usable program code configured to:
determine a plurality of pairs of processes from a plurality of processes, wherein for each of the plurality of pairs, both processes in the pair access a same shared resource;
determine a first pair of processes of the plurality of pairs and a second pair of processes of the plurality of pairs, each process of the first pair of processes executing on different nodes and each process of the second pair of processes executing on different nodes;
determine a first quantity of accesses of a first resource by the first process;
determine a second quantity of accesses of the first resource by the second process;
determine a first score based, at least in part, by multiplying the first quantity of accesses by a weighting value for the first resource;
determine a second score by multiplying the second quantity of accesses by the weighting value;
determine a first priority value of the first pair of processes, based at least in part on the first score and the second score;
determine a second priority value of the second pair of processes, based at least in part on access rates of a second resource of the second pair of processes;
determine that a first priority associated with the first priority value is higher than a second priority associated with the second priority value; and
determine to reassign a first process of the first pair of processes to a first node in response to the determination that the first priority is higher than the second priority, wherein a second process of the first pair of processes is executing on the first node.

9. The computer program product of claim 8, the computer usable program code further comprising code configured to:
determine a third pair of processes, each process of the third pair of processes executing on different nodes;
determine a third priority value of the third pair of processes, based at least in part on a third resource access rate of the third pair of processes;
determine the second priority is higher than a third priority associated with the third priority value; and
determine to reassign a third process of the second pair of processes to the first node in response to the determination that the third priority is higher than the second priority.

10. The computer program product of claim 8, the computer usable program code further comprising code configured to:
determine the first node cannot handle the first process;
determine a second node can handle the first process; wherein the second node is closer in physical proximity to the first node than a third node currently executing the first process; and
determine to reassign the first process to the second node.

11. The computer program product of claim 8, wherein the code configured to determine the first pair of processes and the second pair of processes comprises code to:
determine the first pair of processes and the second pair of processes access or potentially access one or more shared resources.

12. The computer program product of claim 11, wherein the one or more shared resources comprises one or more of: a memory region, a pipe, a socket, a semaphore, a message queue, and a copy-on-write page.

13. The computer program product of claim 8, wherein the first resource accessed by the first process and the second process is different from the second resource accessed by the second pair of processes.

14. The computer program product of claim 13, wherein the code configured to determine to reassign the first process comprises code to determine the first score is less than the second score.

15. An apparatus comprising:
a processor; and
a computer readable storage device coupled to the processor, the computer readable storage device having computer usable program code embodied therewith, the computer usable program code comprising a computer usable program code configured to:
determine a plurality of pairs of processes from a plurality of processes, wherein for each of the plurality of pairs, both processes in the pair access a same shared resource;
determine a first pair of processes of the plurality of pairs and a second pair of processes of the plurality of pairs, each process of the first pair of processes executing on different nodes and each process of the second pair of processes executing on different nodes;
determine a first quantity of accesses of a first resource by the first process;
determine a second quantity of accesses of the first resource by the second process;
determine a first score based, at least in part, by multiplying the first quantity of accesses by a weighting value for the first resource;
determine a second score by multiplying the second quantity of accesses by the weighting value;
determine a first priority value of the first pair of processes, based at least in part on the first score and the second score;
determine a second priority value of the second pair of processes, based at least in part on access rates of a second resource of the second pair of processes;
determine that a first priority associated with the first priority value is higher than a second priority associated with the second priority value; and
determine to reassign a first process of the first pair of processes to a first node in response to the determination that the first priority is higher than the second priority, wherein a second process of the first pair of processes is executing on the first node.

16. The apparatus of claim 15, wherein the computer usable program code further comprises code configured to:
determine a third pair of processes, each process of the third pair of processes executing on different nodes;

determine a third priority value of the third pair of processes, based at least in part on a third resource access rate of the third pair of processes;

determine the second value is higher than a third priority associated with the third priority value; and determine to reassign a third process of the second pair of processes to the first node in response to the determination that the third priority is higher than the second priority.

17. The apparatus of claim 15, wherein the computer usable program code further comprises code configured to:

determine the first node cannot handle the first process;

determine a second node can handle the first process; wherein the second node is closer in physical proximity to the first node than a third node currently executing the first process; and determine to reassign the first process to the second node.

18. The apparatus of claim 15, wherein the code configured to determine the first pair of processes and the second pair of processes comprises code to:

determine the first pair of processes and the second pair of processes access or potentially access one or more shared resources.

19. The apparatus of claim 15, wherein the first resource accessed by the first process and the second process is different from the second resource accessed by the second pair of processes.

20. The apparatus of claim 19, wherein the code configured to determine to reassign the first process comprises code to determine the first score is less than the second score.

* * * * *